United States Patent
Foggiatto et al.

(10) Patent No.: US 11,005,996 B2
(45) Date of Patent: May 11, 2021

(54) CONTACT CENTER NETWORK AND METHOD FOR ESTABLISHING A COMMUNICATION SESSION IN A CONTACT CENTER NETWORK

(71) Applicant: InContact Inc., Salt Lake City, UT (US)

(72) Inventors: Anderson Foggiatto, Curitiba Parana (BR); Diego Roberto Vieira Cassiano, Curitiba Parana (BR); Joao Armenio Neto, Curitiba PR (BR)

(73) Assignee: INCONTACT INC., Salt Lake City, UT (US)

( * ) Notice: Subject to any disclaimer, the term of this patent is extended or adjusted under 35 U.S.C. 154(b) by 0 days.

(21) Appl. No.: 16/958,162

(22) PCT Filed: Dec. 20, 2018

(86) PCT No.: PCT/EP2018/086396
§ 371 (c)(1),
(2) Date: Jun. 26, 2020

(87) PCT Pub. No.: WO2019/129666
PCT Pub. Date: Jul. 4, 2019

(65) Prior Publication Data
US 2020/0374396 A1 Nov. 26, 2020

(30) Foreign Application Priority Data
Dec. 29, 2017 (EP) ..................................... 17211027

(51) Int. Cl.
*H04M 3/523* (2006.01)
*H04M 3/00* (2006.01)
(Continued)

(52) U.S. Cl.
CPC .......... *H04M 3/5183* (2013.01); *H04L 67/12* (2013.01)

(58) Field of Classification Search
CPC ........................... H04M 3/5183; H04L 67/12
(Continued)

(56) References Cited

U.S. PATENT DOCUMENTS

| 8,180,043 | B2 * | 5/2012 | Dezonno | H04M 3/5232 |
| | | | | 379/265.11 |
| 9,667,317 | B2 * | 5/2017 | Gross | H04B 3/52 |

(Continued)

FOREIGN PATENT DOCUMENTS

EP           1239434            9/2002

OTHER PUBLICATIONS

PCT search report for corresponding application No. PCT/EP2018/086396 dated Mar. 11, 2019.
(Continued)

*Primary Examiner* — William J Deane, Jr.
(74) *Attorney, Agent, or Firm* — Pearl Cohen Zedek Latzer Baratz LLP

(57) ABSTRACT

A contact center network including a contact center unit connected via a communication network to a plurality of agents and to a plurality of IoT devices, wherein each one of the plurality of IoT devices is equipped with sensor devices adapted to measure predetermined IoT measurement data, and at least one actuator device adapted to control the IoT device remotely, wherein the contact center unit is connectable to the sensor devices and the actuator devices via a IoT middleware unit adapted to receive an incident notification, if sensor measurement data matches a predetermined criterion indicating an incident, and wherein the contact center unit includes a routing unit adapted to route a contact based on the incident information comprised in the incident noti-
(Continued)

fication to an agent. Further, embodiments relate to a method for establishing a communication session in a contact center network.

10 Claims, 2 Drawing Sheets

(51) Int. Cl.
    *H04M 3/51*     (2006.01)
    *H04L 29/08*     (2006.01)

(58) Field of Classification Search
    USPC ............................. 379/265.01–265.14, 309
    See application file for complete search history.

(56) References Cited

U.S. PATENT DOCUMENTS

| | | | |
|---|---|---|---|
| 9,917,927 B2* | 3/2018 | Liberg | H04L 67/12 |
| 10,848,567 B1* | 11/2020 | Von Muenster | H04L 67/2823 |
| 2009/0274292 A1* | 11/2009 | Diethorn | H04M 3/5232 379/265.11 |
| 2014/0119530 A1 | 5/2014 | Steiner | |
| 2015/0134954 A1* | 5/2015 | Walley | H04W 12/069 713/168 |
| 2016/0072928 A1* | 3/2016 | Liberg | H04W 4/70 370/389 |
| 2016/0337453 A1* | 11/2016 | Lee | H04L 67/327 |
| 2017/0006141 A1* | 1/2017 | Bhadra | H04W 84/18 |
| 2017/0318445 A1* | 11/2017 | Kodaypak | H04W 4/70 |
| 2018/0167279 A1* | 6/2018 | Wang | G06F 21/305 |
| 2018/0191867 A1* | 7/2018 | Siebel | H04L 69/40 |
| 2019/0207829 A1* | 7/2019 | Stoops | H04L 41/5061 |
| 2020/0217695 A1* | 7/2020 | Jang | G06F 3/03545 |

OTHER PUBLICATIONS

European Search report for corresponding application No. EP 17211027.2 dated Jun. 27, 2018.

* cited by examiner

CONTACT CENTER NETWORK AND METHOD FOR ESTABLISHING A COMMUNICATION SESSION IN A CONTACT CENTER NETWORK

PRIOR APPLICATION DATA

This application is a U.S. National Phase Application of PCT International Application No. PCT/EP2018/086396, International Filing Date Dec. 20, 2018, claiming the benefit of European Patent Application No. EP17211027.2, filed Dec. 29, 2017, all hereby incorporated herein by reference.

FIELD OF THE INVENTION

The present invention relates to a contact center network and a method for establishing a communication session in a contact center network.

BACKGROUND

The field of information technology is developing fast in every business sector. Nowadays, it is common practice to connect physical devices, like sensors or wearables, to the Internet. This is called the Internet of Things (IoT) and the connectable devices are referred to as IoT devices. With connection of IoT devices to the Internet or to another computer network, these devices can be monitored and controlled remotely. The control can be carried out manually or in an automatic manner. However, some emergency or exceptional situations or scenarios need immediate attention of an expert who takes care of the situation, analyzes the cause for it, for example, on the basis of data collected by sensor devices, and who then decides on what to do and takes the corresponding actions so as to solve the problem which triggered the emergency state. If these steps are taken rather quickly, in most cases, damage can be prevented or at least minimized.

Also, scenarios are conceivable according to which data is collected, monitored, and analyzed over a period of time. For example a certain value or parameter is monitored and, although still being in an acceptable or uncritical range, the value or parameter might reveal a trend, e.g., indicating that it will exceed a threshold value and, thus, might be out of the uncritical range soon, then an expert monitoring the data might take appropriate steps even before a critical or emergency situation occurs.

However, a problem exists in prior art that experts for handling such situations need to be found and contacted immediately upon detecting an emergency or exceptional situation in, for example, in an IoT device.

SUMMARY

Therefore, the present invention is based on the object of providing a system and a method for identifying an emergency or exceptional situation in an IoT device which enables immediate contact of an expert who is able to cope with the problem and take the appropriate actions.

According to the invention, this problem is solved by a contact center system having the features according to claim 1, and a method for establishing a communication session in a contact center network having the features according to claim 10.

According to the invention, a contact center network comprising a contact center unit which is connected via a communication network to a plurality of agents and to a plurality of IoT devices is provided, wherein each one of the plurality of IoT devices is equipped with at least one sensor device adapted to measure predetermined measurement data in that IoT device, and at least one actuator device adapted to control the IoT device remotely, wherein the contact center unit is connectable to the sensor devices and the actuator devices via a middleware unit comprising IoT middleware, the contact center unit being adapted to receive an incident notification comprising incident information created and transmitted by the IoT middleware, if the measurement data of any one of the sensor devices matches a predetermined criterion indicating an incident, and wherein the contact center unit further comprises a routing unit adapted to route a contact based on the incident information comprised in the incident notification to an agent.

Usually, contact centers are used, for example, in companies for supporting interaction with customers over various media like telephony, e-mail, social media or the like, whereby the contacts are handled at a central point routing the contacts on the basis of contact information to appropriate agents. Contact centers, as for example, cloud or Internet based contact centers, basically provide a platform for connecting people to agents using, for example, a globally or locally connected communication network and the corresponding software application. However, this well-developed and widespread technology may also be used for receiving information on exceptional states of IoT devices and connecting information on that exceptional state and the respective IoT device to an appropriate expert without any time loss or manual interaction.

Here, an exceptional state of an IoT device connected to the contact center system or network is detected by sensors, an incident notification is automatically generated, and in the contact center, the most skilled contact center agent is selected based on, for example, the categorization of the incident, allowing the incident to be handled by a skilled agent in a timely appropriate manner. A communication session is established between the agent and the affected IoT device in such a way that the agent can send commands or instructions to the IoT device, for example, for receiving further measurement data from this IoT device. At the same time, the communication session which is established for this incident in the contact center network may also be used to transmit real time media like video or audio streams or the like, which is captured by cameras or other devices which are installed on or nearby the monitored devices. This configuration, for the agent selected to handle the incident, makes it even easier to analyze the situation.

Thus, by the contact center system or network according to the present invention, incidents occurring in IoT devices and identified by means of sensor devices provided in or at the IoT devices may be routed by a contact center based on skill based routing, thereby allowing an agent to interact with an affected IoT device immediately by means of actuators, so as to resolve the problem in a most efficient and competent as well as fast manner.

According to a preferred embodiment, the contact center unit is adapted to establish a communication session between the agent and the IoT device which has sent the incident notification and to authorize the agent to handle the contact.

According to a further preferred embodiment the agent, on the basis of the incident information, remotely sends a command to the actuator of the IoT device which has sent the incident notification so as to resolve the incident detected by the sensor.

According to still a further embodiment, the routing unit comprises a skill based routing mechanism, which is adapted to select the agent from a plurality of agents for handling the contact on the basis of his skills. The permission or authorization for the agent selected to handle the contact for a specific device is given by the contact center unit, in particular, by its authorization unit, whereby the authorization to handle incidents on IoT devices connected in the control center system or network is given on the basis of the skills of the agent so that always the agent having the best knowledge on a specific IoT device is selected and authorized in case of an incident occurring in this IoT device. Thus, other agents will not be selected and/or authorized to handle a contact concerning an incident notification for an IoT device for which he or she is not an expert or has specific knowledge. Thereby, damage on the IoT devices due to lack of knowledge is also prevented.

The routing unit may comprise a verification unit, which, for selecting the agent for handling the contact, is adapted to access a table in a database, in which the agents of the plurality of agents are mapped to IoT devices according to their skills.

Preferably, the measurement data relates to a parameter measured by a respective sensor device of the plurality of sensor devices, and wherein the middleware unit further has a monitor unit adapted to monitor and analyze the respective parameters with respect to the predetermined criterion, the predetermined criterion being a threshold value lying outside of a predetermined range preset for the respective parameters.

Further, it is advantageous, if the middleware unit further comprises a storage unit adapted to store the measurement data received from the sensor devices, a conversion unit adapted to convert the measurement data received from the sensor devices to a format that can be interpreted, stored, manipulated, and propagated in the contact center system or network 1, and thus, being compatible with a contact center interface; and an identification unit adapted to identify an incident occurring in an IoT device of the plurality of IoT device on the basis of the measurement data for that IoT device monitored in the monitor unit.

Moreover, the middleware unit may further comprise an incident request unit adapted to send a contact request to the contact center unit, if the identification unit has identified an incident for an IoT device of the plurality of IoT devices, the contact request comprising data concerning the identification of the IoT device concerned, and/or the device name and/or type of the IoT device concerned, and/or the measured parameter and/or a value of the measured parameter.

According to still another preferred embodiment, the middleware unit further comprises a verification unit adapted to verify the authorization of the predetermined agent to handle the contact transmitted from the contact center unit.

Also, according to the present invention, a method for establishing a communication session in a contact center network is provided, in which a contact center unit is connected via a communication network to a plurality of agents and, via a middleware unit, to a plurality of IoT devices, wherein each one of the plurality of IoT devices is equipped with at least one sensor device for measuring predetermined measurement data, and at least one actuator device for controlling the IoT device remotely, the method comprising the steps of: transmitting the measurement data from at least one IoT device of the plurality of the IoT devices to the middleware unit; monitoring the measurement data received from the at least one IoT device in the middleware unit, and, if it is determined that the measurement data does not meet a predetermined criterion, generating an incident notification; transmitting a contact to the contact center unit comprising the incident notification and incident information; selecting and authorizing, in the contact center unit, an agent from the plurality of agents for handling the contact based on the incident information comprised in the incident notification; routing the contact to the agent selected, wherein the agent selected for handling the contact uses a communication session generated for sending the contact from the middleware to the contact center unit and to the agent to remotely control an actuator of the at least one IoT device for regulating a parameter responsible for the generation of the incident notification. The method according to the invention provides the advantages described above.

In summary, by the contact center network or system and the method for establishing a communication session in such a contact center network, generally, incidents can be routed to contact center agents in order to better or best match the contact center agents according to their skills for handing the incident. Different media types can be used to establish a communication session between an IoT device and the agent, like voice, video, e-mail, chat and social media. Thereby, IoT devices equipped with sensors and actuators, and which might require interaction of a human being, for example, by operating it remotely. The identification of the best skilled person to handle an incident identified by means of a sensor in an IoT device is done by a contact center system or network, as described above. The same session which is created to pass information about the IoT device sensors to the agent can also be used by the agent to remotely execute actions on actuators which allow the remote control of the IoT device. The authorization of the agent is determined by means of skills which are assigned to the agent. These skills are associated to the devices from which the contact has originated. Thus, when a contact is received in the contact center, the contact center verifies the skills which are associated with the IoT device concerned and from which the contact originated and the contact is routed to agent which is associated to one of the corresponding skills. The agent may be authenticated by the contact center upon logging in. The authentication process may be initiated between the contact center system or network and the IoT middleware, or the IoT middleware may also directly ask the agent for authentication, when the session is established and the agent tries to send commands or instructions to a sensor or to an actuator of an affected IoT device and an incident to be handled by this agent.

The present invention relates to a contact center network (1) comprising a contact center unit (2) which is connected via a communication network (3) to a plurality of agents (4) and to a plurality of IoT devices (5), wherein each one of the plurality of IoT devices (5) is equipped with at least one sensor device (6) adapted to measure predetermined measurement data in that IoT device (6), and at least one actuator device (7) adapted to control the IoT device (5) remotely, wherein the contact center unit (2) is connectable to the sensor devices (6) and the actuator devices (7) via a middleware unit (8) comprising IoT middleware, the contact center unit (2) being adapted to receive an incident notification comprising incident information created and transmitted by the IoT middleware, if the measurement data of any one of the sensor devices (6) matches a predetermined criterion indicating an incident, and wherein the contact center unit (2) further comprises a routing unit (9) adapted to route a contact (19) based on the incident information comprised in the incident notification to an agent (4). Further, the present invention relates to a method for establishing a communication session in a contact center network (1).

BRIEF DESCRIPTION OF THE DRAWINGS

The invention and embodiments thereof are described in connection with the drawings.

DETAILED DESCRIPTION

Figure 1:
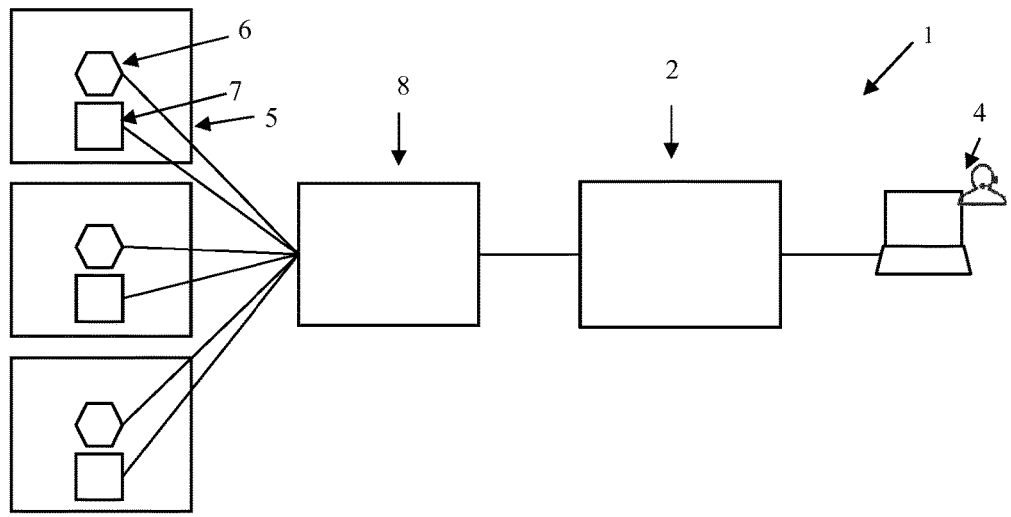
FIG. 1 illustrates a basic contact center network architecture according to an embodiment of the invention.

FIG. 1 shows the basic structure of a contact center system or network 1 according to an embodiment of the invention. Here, an overview of the contact center solution is given. As can be seen, there are several IoT devices 5, each of which comprises at least one sensor device 6 and at least one actuator device 7 respectively connected to an IoT middleware 8. The IoT middleware 8 is a concentrator which is connected to a contact center unit 2. The contact center unit provides a contact center application and is able to distribute contacts to agents 4. The contacts result from measurements of an IoT sensor devices 6 which are used in the IoT devices 5 to perform measurements on different parameters like temperature, pressure, vibration, distance and many others. The IoT devices 5 also contain actuator devices 7 which allow performing actions on the IoT devices 5 or which allow control of the latter. In order to concentrate the monitoring of the various IoT devices 5, an IoT middleware unit 8 or IoT framework is used. The IoT middleware unit 8 comprises middleware so as to enable the middleware unit 8 to perform tasks like identifying situations which correspond to unexpected behavior of the IoT devices, convert measurement data received from the various sensor devices 6 to a format that can be interpreted, stored, manipulated, and propagated in the contact center system or network 1, and/or store sensor measurements between others. The contact center system or network 1 receives the contacts originating from the IoT devices 5 and has mechanisms to determine the best skilled agent 4 to analyze the measurement data and to take the correct actions to solve the problem. The agent 4 receives the contact on the contact center application running, for example, on a client computer (not shown) in the contact center unit 2 or in the cloud, with details about the measurement data which identified the incident being reported.

Figure 2:
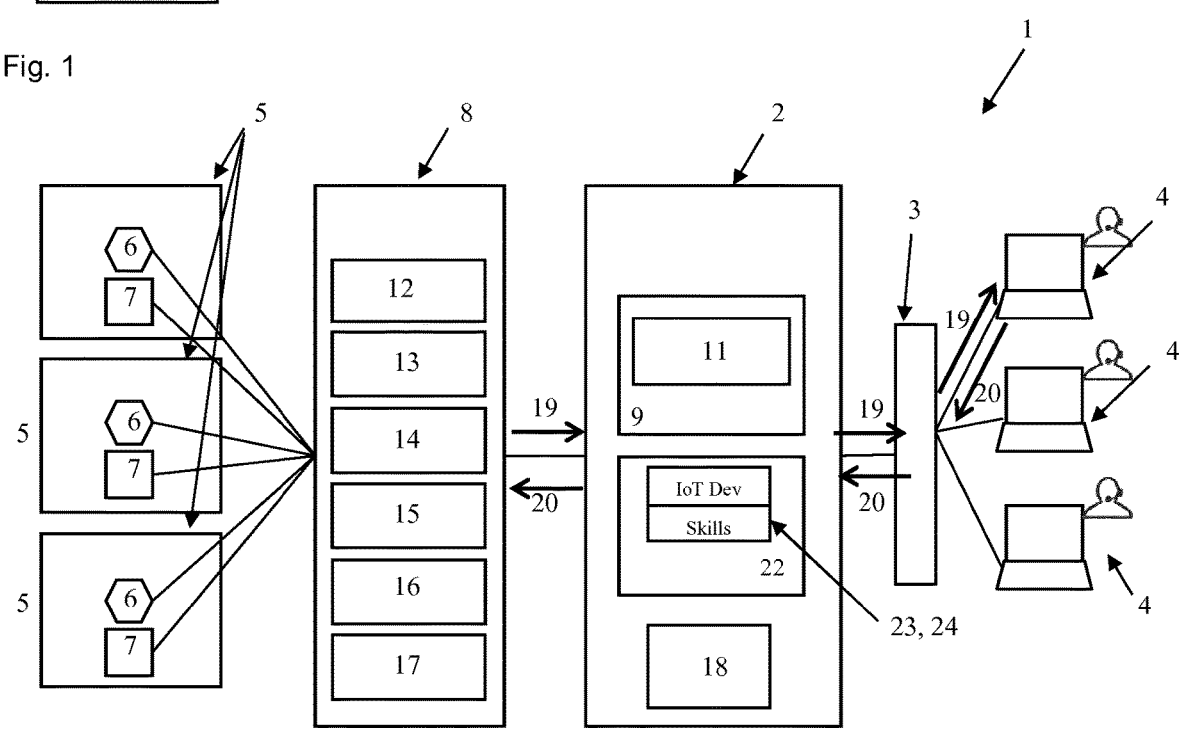
FIG. 2 illustrates a more detailed contact center network architecture according to an embodiment of the invention.

FIG. 2 illustrates a contact center system or network 1 which corresponds to the basic structure of the embodiment shown in FIG. 1 and which comprises a contact center unit 2, connected via a communication network 3 to a plurality of agents 4, from which here, only one is shown, and to a plurality of IoT devices 5, each one comprising at least one sensor device 6 and at least one actuator device 7. A middleware unit 8 is interposed in the connection between the contact center unit 2 and the IoT devices 5.

Further, a contact center application is implemented in the contact center unit 2, either for example, on a server or a client computer (not shown). The contact center unit 2 further comprises a routing unit 9 with a skill based routing mechanism, which is adapted to select the agent from a plurality of agents for handling a contact on the basis of his skills, an authorization unit 10 for authorizing an agent to handle a contact for an incident in a specific device on the basis of his skills. The routing unit further comprises a verification unit 11 for selecting an agent for handling a contact for an incident in an affected IoT device 5 on the basis of his skills. For example, the verification unit 11 may be adapted to access a table 23 in a database 24, in which the agents of the plurality of agents are mapped to IoT devices according to their skills. Further, the verification unit 11 is adapted to verify the status of the agent 4. For example, the verification unit 11 is adapted to verify, whether an agent 4 is logged in, whether he or she is available for handling contacts 19, to verify the priority of the contact 19 and also additional contact data provided by the IoT middleware unit 8.

It is noted that the contact center unit 2 may also comprise, amongst other, a contact routing mechanism provided as a computerized system for analyzing incoming contacts and distributing the contacts based on various predetermined factors, a knowledge management system as a searchable central repository of information, and/or a workforce management system for aiding in scheduling and staffing agents and managing agent performance. The contacts may be communicated in a variety of media, like voice, video, e-mail, chat, instant messaging, social media, or any kind of text media. These, and further optional units or units which are commonly known to be comprised in a call center may further be implemented in the call center network 1.

The middleware unit 8 has a monitor unit 12 adapted to monitor and analyze the respective parameters with respect to a predetermined criterion. The predetermined criterion may be, for example, a threshold value lying outside of a predetermined range preset for the respective parameters. Alternatively, the predetermined criterion may also be a trend towards a critical value for an IoT device 5.

Further, the middleware unit comprises a storage unit 13 adapted to store the measurement data received from the sensor devices 6, a conversion unit 14 adapted to convert measurement data received from the sensor devices so as to be compatible with a contact center interface; and an identification unit 15 adapted to identify an incident occurring in an affected IoT device 5 of the plurality of IoT device on the basis of the measurement data for that IoT device monitored in the monitor unit 12.

Moreover, the middleware unit according to this embodiment further comprises an incident request unit 16 adapted to send a contact request to the contact center unit 2, if the identification unit 15 has identified an incident for an IoT device 5. The contact request comprises data concerning the identification of the affected IoT device 5, and may further comprise the device name and/or type of the IoT device concerned, and/or the measured parameter and/or a value of the measured parameter.

The middleware unit 8 also comprises a verification unit 17 adapted to verify the authorization of an agent selected by the contact center unit 2 for handing a contact for an incident occurring in one of the IoT devices 5.

Figure 3:
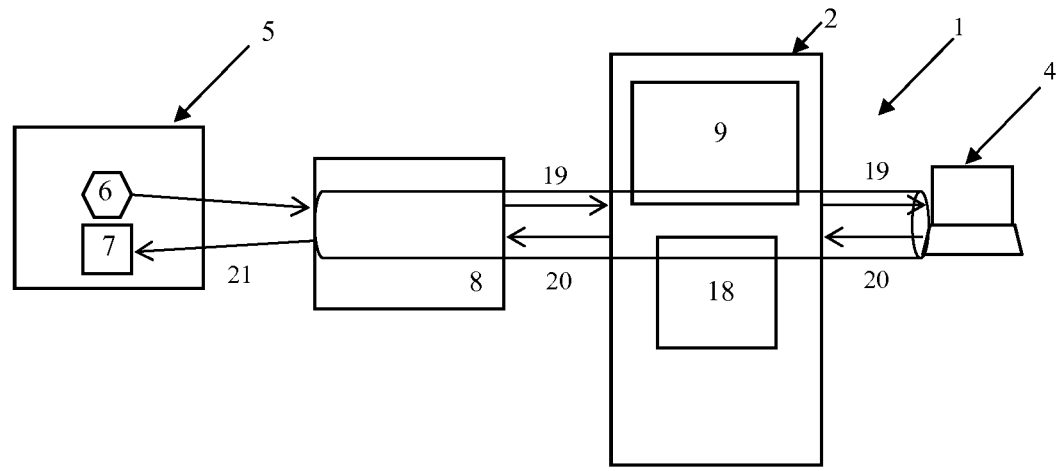
FIG. 3 illustrates a scheme for showing the data flow in the contact center network of FIG. 1.

FIG. 3 illustrates a scheme for showing the data flow in the contact center network 1 or contact center system of FIG. 1 or FIG. 2. Basically, the sensor devices 5 send their measurement data to the IoT middleware unit 8 which collects the sensors measurements. When identifying a situation which need to be handled by a human being, the middleware unit 8 initiates the creation of a contact on the contact center unit 1 which then routes the incident to the best skilled agent 4 from the plurality of agents. The agent 4 uses the same communication session to remotely send a command or instruction to the actuator device 7 in order to solve or mitigate the problem, to perform some tests, or even to collect more data.

As can be seen here, the flow of data through the contact center network 1 or system components for the scenario of a contact being created from the measured data provided by one of the sensor devices 6 is shown. The IoT sensor device 6 performs the measurement and sends the data to the IoT middleware unit 8. The IoT middleware unit 8 analyzes the received measurement. If the received measurement data is inside the expected or predetermined range, the IoT Middleware will store the data and no further action is required. If the received measurement data is outside the expected range or presents a trend which indicates future problem, the IoT middleware unit 8, i. e., a predetermined criterion is met for triggering the establishment of a communication session, then stores the data and sends a new contact request to the contact center unit 2 with data like device identification, device name, device type, device model, measured parameter name and value or the like. The contact center unit 2 will use its skill based routing mechanism in the routing unit 9 to analyze the received data based on the device type, on the measured parameter name and value to determine the best skilled agent to handle this contact. Further, it may also prioritize the handling of the contact. If there is no free agent which would match with respect to his skills the handling of the contact, the contact may be placed in a queue 18. If after a predetermined or predefined period of time no agent is available, the skill based routing mechanism can be used again by using less stringent rules which will expand the number of agents which are eligible to handle the contact. When an agent is available, the contact is routed to that agent 4. When the agent 4 accepts the contact 19, a communication session is created between the agent 4 and the IoT device 5, which is represented by the tunnel in the figure. This communication session allows that the agent 4 sends commands or instructions to the IoT device 5 asking for new measurement values from the sensor devices 6 or instructing actions to be taken by the actuator devices 7. The agent 4 analyzes the data available in the contact 19 and sends a message to the contact center unit 2 with a command 20 to the sensor device 6 or to the actuator device 7. The contact center unit 2 passes this message to the IoT middleware unit 8. The IoT middleware unit identifies the sensor device 6 or actuator device 7 to which the agent 4 sent the command, verifies if the agent 4 is authorized to interwork with the actuator device 7 and converts the command to something that is understandable by the sensor device 6 or actuator device 7 and sends it to it, indicated by reference numeral 21 in the figure. New data can be collected from the sensor device 6 and may be sent to the agent 4 who may send further commands to the sensor device 6 and actuator device 7 until the communication session is terminated by the agent 4. In addition to data collected by sensor devices 6, real time media like video can also be employed by cameras which are installed at or nearby the monitored devices 6, 7. These cameras (not shown) can also be controlled by the contact center agent 4 by means of the same communication session.

Figure 4:
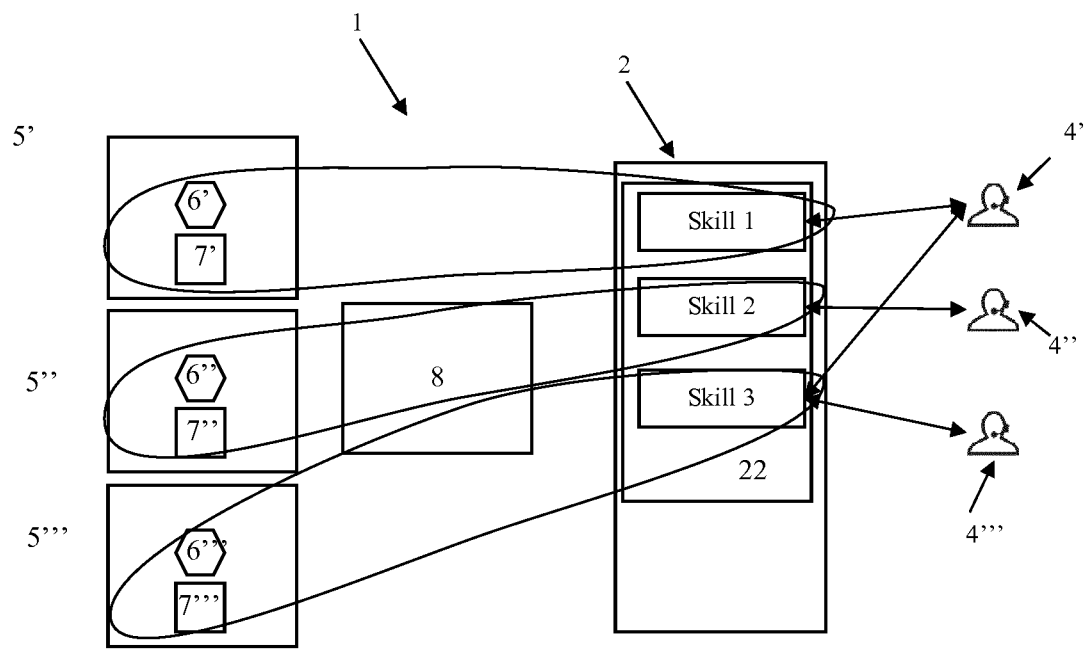
FIG. 4 is a schematic illustration for showing the assignment of agents to IoT device according to an embodiment of the invention.

FIG. 4 illustrates the mechanism of an authorization procedure for an agent 4 to handle a contact by providing him/her the permission or authorization to interact with a set of sensor devices 6/actuator devices 7. For example, a contact center administrator may assign one or more skills to an agent 4. The skills can also be assigned to and associated with the sensor device 6 or IoT device 5, respectively, from which the contact originated. Thus, when a contact is received in the contact center unit 2 from a specific IoT device 5 or its sensor device 6, the agent or agents 4 which are associated with the corresponding skills will be eligible and authorized to handle the contact.

For example, as can be seen in the figure, the contact center unit 2 comprises a storage unit 22 in which, for example, in a corresponding table 23, agent 4' is assigned to the IoT device 5' and 5''' since he has the corresponding skills, here indicated as skill 1, for controlling the device or for handling an exceptional situation occurring in the device remotely. Therefore, the agent 4' according to this authorization schema for handling contacts, is authorized for IoT devices 5' and 5''. The agent 4'' having different skills, indicated by skill 2, is authorized for handling IoT device 5''', whereas the agent 4''' having still different skills, indicated as skill 3, is authorized for handing IoT device 5''. Thus, according to their skills, here, there are two agents 4' and 4''' which are authorized, for example, for handling IoT device 5''.

REFERENCE NUMERALS 1 contact center network or system
2 contact center unit
3 communication network
4 agent
5 IoT device
6 sensor device
7 actuator device
8 middleware unit
9 routing unit
10 authorization unit
11 verification unit of control center unit
12 monitor unit
13 storage unit of IoT middleware unit
14 conversion unit
15 identification unit
16 incident request unit
7 verification unit of middleware unit
18 queue
19 contact
20 command
21 converted command
22 storage unit of contact center unit
23 table
24 database

The invention claimed is:

1. Contact center network comprising a contact center unit which is connected via a communication network to a plurality of agents and to a plurality of IoT devices,
   wherein each one of the plurality of IoT devices is equipped with at least one sensor device adapted to measure predetermined measurement data in that IoT device, and at least one actuator device adapted to control the IoT device remotely,
   wherein the contact center unit is connectable to the sensor devices and the actuator devices via a middleware unit comprising IoT middleware, the contact center unit being adapted to receive an incident notification comprising incident information created and transmitted by the IoT middleware, if the measurement data of any one of the sensor devices matches a predetermined criterion indicating an incident, and wherein the contact center unit further comprises a routing unit adapted to route a contact based on the incident information comprised in the incident notification to an agent.

2. Contact center network according to claim 1, wherein the contact center unit is adapted to establish a communication session between the agent and the IoT device which has sent the incident notification and to authorize the agent to handle the contact.

3. Contact center network according to claim 1, wherein the agent, on the basis of the incident information, remotely sends a command to the actuator device of the IoT device which has sent the incident notification so as to resolve the incident detected by the sensor device, and/or remotely sends at least one command to the sensor device so as to send further measurement data related to the incident.

4. Contact center network according to claim 2, wherein the routing unit comprises a skill based routing mechanism, which is adapted to select the agent from a plurality of agents for handling the contact on the basis of his skills.

5. Contact center network according to claim 4, wherein the routing unit comprises a verification unit, which, for selecting the agent for handling the contact, is adapted to access a table in a database, in which the agents of the plurality of agents are mapped to IoT devices according to their skills.

6. Contact center network according to any one of the preceding claims, wherein the measurement data relates to a parameter measured by a respective sensor device of the plurality of sensor devices, and wherein the middleware unit further has a monitor unit adapted to monitor and analyze the respective parameters with respect to the predetermined criterion, the predetermined criterion being a threshold value lying outside of a predetermined range preset for the respective parameters.

7. Contact center network according to claim 1, wherein the middleware unit further comprises:
   a storage unit adapted to store the measurement data received from the sensor devices,
   a conversion unit adapted to convert the measurement data received from the sensor devices to a format compatible with a contact center interface; and
   an identification unit adapted to identify an incident occurring in an IoT device of the plurality of IoT device on the basis of the measurement data for that IoT device monitored in the monitor unit.

8. Contact center network according to claim 7, wherein the middleware unit further comprises an incident request unit adapted to send a contact request to the contact center unit, if the identification unit has identified an incident for an IoT device of the plurality of IoT devices, the contact request comprising data concerning the identification of the IoT device concerned, and/or the device name and/or type of the IoT device concerned, and/or the measured parameter and/or a value of the measured parameter.

9. Contact center network according to claim 1, wherein the middleware unit further comprises a verification unit adapted to verify the authorization of the predetermined agent to handle the contact transmitted from the contact center unit.

10. Method for establishing a communication session in a contact center network in which a contact center unit is connected via a communication network to a plurality of agents and, via a middleware unit, to a plurality of IoT devices, wherein each one of the plurality of IoT devices is equipped with at least one sensor device for measuring predetermined measurement data, and at least one actuator device for controlling the IoT device remotely, the method comprising the steps of:
   transmitting the measurement data from at least one IoT device of the plurality of the IoT devices to the middleware unit;
   monitoring the measurement data received from the at least one IoT device in the middleware unit, and, if it determined that the measurement data does not meet a predetermined criterion, generating an incident notification;
   transmitting a contact to the contact center unit comprising the incident notification and incident information;
   selecting and authorizing, in the contact center unit, an agent from the plurality of agents for handling the contact based on the incident information comprised in the incident notification;
   routing the contact to the agent selected, wherein the agent selected for handling the contact uses a communication session generated for sending the contact from the middleware unit to the contact center unit and to the agent to remotely control an actuator device of the at least one IoT device for regulating a parameter responsible for the generation of the incident notification, and/or to remotely send at least one command to the sensor device so as to send further measurement data related to the incident.

* * * * *